(No Model.)
A. B. CLAYTON.
COMBINED TRAP AND GRAPPLING DEVICE.
No. 560,973. Patented May 26, 1896.
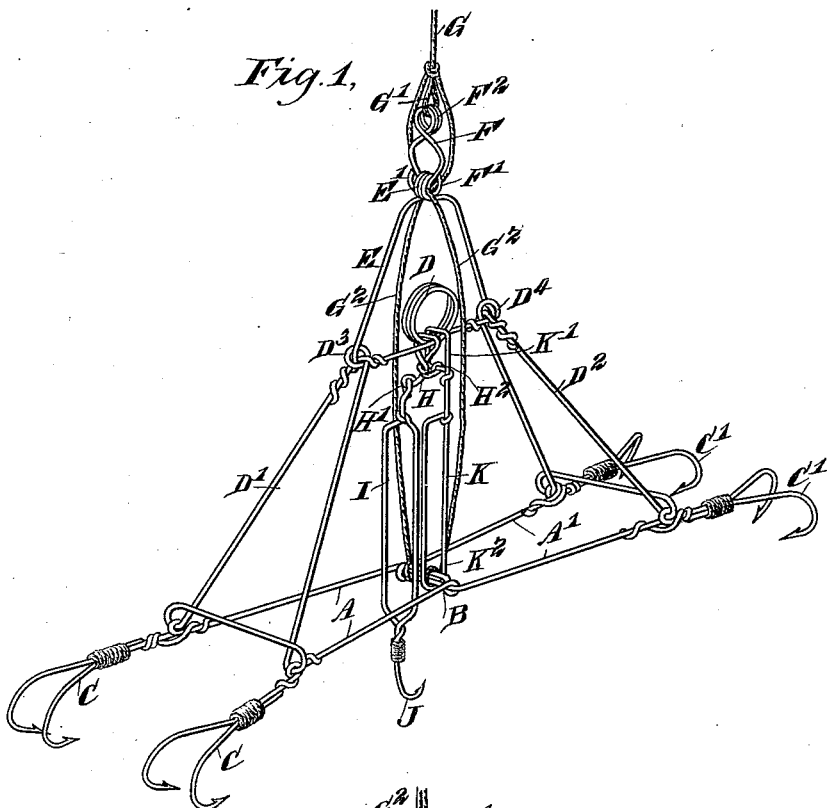
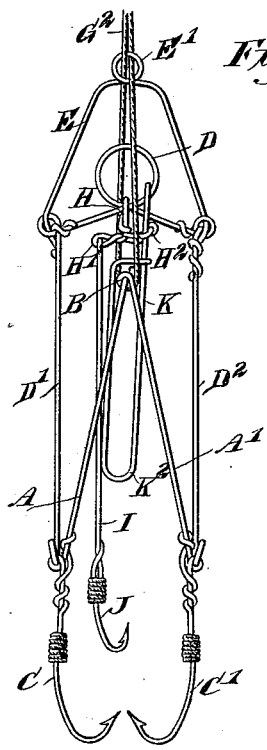
WITNESSES:
Edward Thorpe
INVENTOR
A. B. Clayton
BY
Munn & Co
ATTORNEYS.

UNITED STATES PATENT OFFICE.

AUSTIN B. CLAYTON, OF DOVER, MISSOURI.

COMBINED TRAP AND GRAPPLING DEVICE.

SPECIFICATION forming part of Letters Patent No. 560,973, dated May 26, 1896.

Application filed September 21, 1895. Serial No. 563,202. (No model.)

*To all whom it may concern:*

Be it known that I, AUSTIN B. CLAYTON, of Dover, in the county of Lafayette and State of Missouri, have invented a new and Improved Hooking and Grappling Device, of which the following is a full, clear, and exact description.

The object of the invention is to provide a new and improved hooking and grappling device which is simple and durable in construction and designed for use in fishing and trapping animals and grappling lost or other objects in cisterns, wells, lakes, rivers, and other places.

The invention consists principally of stocks pivotally connected with each other and carrying at their free ends hooks, a central coil-spring connected at its ends with said stocks, and means for engaging the stocks at their pivots to cause the latter to close.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in both the figures.

Figure 1 is a perspective view of the improvement in an open position, and Fig. 2 is a side elevation of the same in a closed position.

The improved hooking and grappling device is provided with sets of stocks A and A', respectively, pivotally connected with each other at B and carrying at their outer ends hooks C and C', respectively. The stocks A and A' are engaged near their outer ends by the ends D' and D² of a coil-spring D, arranged a suitable distance above the pivot B and adapted to cause a sudden closing of the stocks A and A', as hereinafter more fully described. The ends D' and D² are made L-shaped and are formed at their corners with loops D³ and D⁴, respectively, arranged at the lower ends of a bail E, formed at its upper end with a coil-spring E', adapted to be engaged in its opening by the ends F' of a clamping-hook F, also provided with a coil-spring F², engaged by a loop G' of a rope or line G.

The coil-spring D supports a trigger H, formed with two arms H' and H², standing in opposite directions, the arm H' being provided at its outer end with a downwardly-hanging bait-hook I, reaching with its hook J a suitable distance below the pivot B when the stocks A and A' are in an open position, as shown in Fig. 1. The other arm, H², of the trigger H engages a loop K', formed on an arm K, engaging at its lower end K² the pivot B, so that when the stocks A and A' are in an open position then the arm K prevents a closing of the stocks in an upward direction by the action of the ends D' and D² of the spring. When, however, the arm K is moved downward by the bait-hook I being pulled downward to cause a swinging of the trigger H, then a pull is exerted in an upward direction on the pivot B, so that the latter is lifted to cause the ends D' and D² of the spring D to suddenly close the stocks, as shown in Fig. 2. Thus when the device is in an open position, as shown in Fig. 1, and the hook J carries bait and an animal snaps at the bait and pulls downward on said bait-hook, then the trigger H is caused to swing and pull the arm K upward and cause an upward movement of the pivot B until the latter is above a horizontal plane passing through the points of connection of the ends D' and D² with the stocks A and A'. As soon as this takes place the spring ends D' and D² press the stocks A and A' downward and cause the stocks to swing inward. The stocks in doing so move the hooks C and C' into engagement with the head of the animal to securely hold the same.

When it is desired to use the device for other purposes than trapping and fishing—for instance, for grappling an object in a cistern, river, lake, &c.—then the line or rope G is provided with two branch lines G², extending through the spring E' downward, to connect with the pivot B. Now by exerting a pull on the rope G the lines G² pull on the pivot B and cause the stocks A and A' to swing toward each other, so that the hooks C and C' close upon the object, and the latter can now be drawn or pulled up.

The hook F is for the purpose of relieving the spring D of any strain in case of a heavy weight, it being understood that the said hook F then disengages with its free end F' the eye on the spring E, so that the pivot B and consequently the stocks A and A' are directly supported on the branch lines G² and line G.

Having thus fully described my invention, I claim as new and desire to secure by Letters Patent—

1. A device of the class described, comprising stocks pivotally connected with each other and carrying at their free ends hooks, a central coil-spring connected at its ends with the said stocks, an arm for limiting the opening movement of the said stocks, and a connection with the stocks at their pivot for raising the pivot above the horizontal plane of the stocks to allow a grappling movement of said stocks, substantially as shown and described.

2. A device of the class described, comprising stocks pivotally connected with each other and carrying at their free ends hooks, a central coil-spring connected at its ends with the said stocks, an arm having a loop at its upper end engaging the said spring, a loop at its lower end engaging the said pivot, a trigger supported from the said spring and connected with the said arm, and a bait-hook hung on the said trigger, substantially as shown and described.

3. A device of the class described, comprising stocks pivotally connected with each other and carrying at their free ends hooks, a central coil-spring connected at its end with the said stocks, an arm having a loop at its upper end engaging the said spring, a loop at its lower end engaging the said pivot, a trigger supported from the said spring and connected with the said arm, a bait-hook hung on the said trigger, and a bail connected with the ends of the said central spring, substantially as shown and described.

4. A device of the class described, comprising stocks pivotally connected with each other and carrying at their free ends hooks, a central coil-spring connected at its end with the said stocks, an arm having a loop at its upper end engaging the said spring, a loop at its lower end engaging the said pivot, a trigger supported from the said spring and connected with the said arm, a bait-hook hung on the said trigger, a bail connected with the ends of the said central spring, and a hook engaging the spring of the said bail and connected with a line or rope attached to the said pivot, substantially as shown and described.

AUSTIN B. CLAYTON.

Witnesses:
WM. W. MENG,
R. E. L. HITT.